(12) United States Patent
Ohkawa et al.

(10) Patent No.: US 6,726,844 B2
(45) Date of Patent: Apr. 27, 2004

(54) ISOTOPE SEPARATOR

(75) Inventors: Tihiro Ohkawa, La Jolla, CA (US);
Robert L. Miller, San Diego, CA (US)

(73) Assignee: Archimedes Technology Group, Inc., San Diego, CA (US)

( * ) Notice: Subject to any disclaimer, the term of this patent is extended or adjusted under 35 U.S.C. 154(b) by 120 days.

(21) Appl. No.: 10/171,480

(22) Filed: Jun. 12, 2002

(65) Prior Publication Data

US 2003/0230536 A1 Dec. 18, 2003

(51) Int. Cl.[7] .................................................. B03C 1/02
(52) U.S. Cl. ........................ 210/695; 210/748; 210/222; 210/243; 209/12.1; 209/227; 96/2; 96/3; 95/28
(58) Field of Search ................................. 210/222, 223, 210/243, 695, 512.1, 748, 787; 209/12.1, 227, 722, 725; 96/1, 2, 3; 95/28

(56) References Cited

U.S. PATENT DOCUMENTS

| 3,722,677 | A | 3/1973 | Lehnert |
|---|---|---|---|
| 5,868,909 | A | 2/1999 | Eastlund |
| 5,939,029 | A | 8/1999 | Ohkawa |
| 6,096,220 | A | 8/2000 | Ohkawa |
| 6,214,223 | B1 | 4/2001 | Ohkawa |
| 6,235,202 | B1 | 5/2001 | Ohkawa |
| 6,248,240 | B1 | 6/2001 | Ohkawa |
| 6,251,281 | B1 | 6/2001 | Ohkawa |
| 6,251,282 | B1 | 6/2001 | Putvinski et al. |
| 6,322,706 | B1 | 11/2001 | Ohkawa |
| 6,398,920 | B1 | * | 6/2002 | Ohkawa et al. .............. 422/186 |

OTHER PUBLICATIONS

Guss, The Plasma Centrifuge, pp. 1–44, Sep. 5, 1996, Science Research Laboratory.

* cited by examiner

*Primary Examiner*—David A. Reifsnyder
(74) *Attorney, Agent, or Firm*—Nydegger & Associates

(57) ABSTRACT

An isotope separator includes a cylindrical chamber having first and second ends, and a length "L." Inside the chamber, an E×B field is applied to produce plasma rotation. The energy in the plasma rotation is chosen to be much higher than the electron temperature which is clamped by radiation. As the plasma then transits the chamber through the length "L", the electrons cool the thermal temperature of the isotope ions while maintaining the rotation. Under these conditions, the minority and majority isotopes become substantially separated from each other before they exit the chamber. To achieve this result, E×B is determined using mathematically derived expressions and, in compliance with these parameters, the length "L" of the chamber is determined so that the plasma residence time in the chamber, $\tau_1$, will be greater than the cooling time, $\tau_2$ ($\tau_1 > \tau_2$) necessary to affect isotope separation.

14 Claims, 1 Drawing Sheet

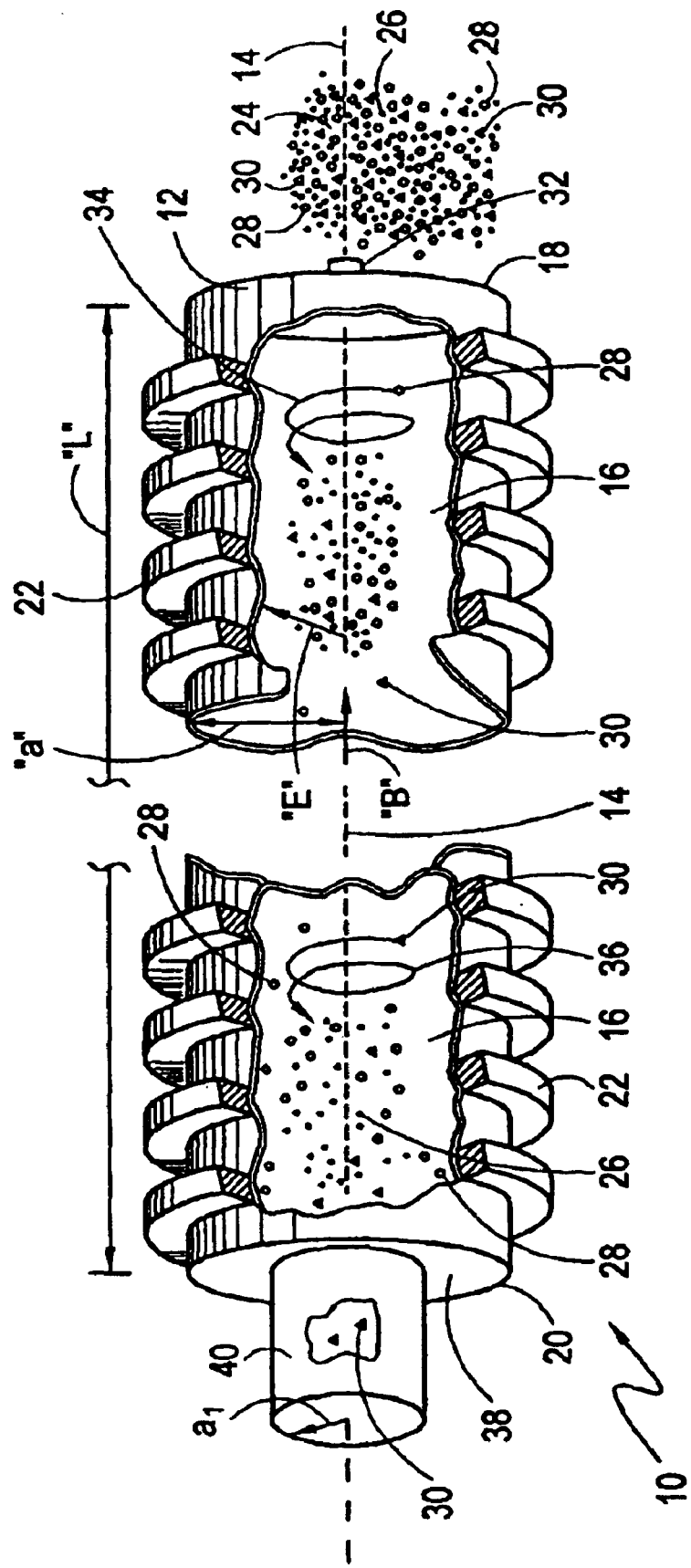
Figure

ISOTOPE SEPARATOR

FIELD OF THE INVENTION

The present invention pertains generally to devices and methods for separating minority isotopes from majority isotopes. More particularly, the present invention pertains to functional parameters and dimensional considerations for a long plasma centrifuge that allows the device to be operated as an isotope separator. The present invention is particularly, but not exclusively, useful as devices and methods for separating isotopes when the difference between the mass numbers of the isotopes is relatively minimal ($\Delta M/M \ll 1$).

BACKGROUND OF THE INVENTION

Whenever charged particles (e.g. plasmas containing electrons and positively charged ions) are subjected to crossed electric and magnetic fields (E×B), a rotational energy is imparted to the particles that causes them to rotate around an axis. This axis is defined by the relative orientation of the electric and magnetic fields, and the rotational energy that is imparted to the particles is determined by the magnitudes of the respective electrical and magnetic fields. During the rotation of charged particles in crossed electric and magnetic fields, collisions between the particles will "heat" the particles to an energy comparable to the rotation energy. The electron temperature ($T_e$) in the plasma can be controlled independently and is chosen to be 1–5 eV giving a ratio of ion temperature to electron temperature of about one hundred to one ($T_i/T_e=100/1$). Stated differently, with a given rotational energy for the ions in a rotating plasma, the ion temperature will be around one hundred times hotter than the electrons in the plasma.

It is also well known that plasma centrifuges, which rely on the rotational phenomenon mentioned above, can be used to separate charged particles from each other. Recently, it has also become known that plasma mass filters, such as disclosed in U.S. Pat. No. 6,096,220 which issued to Ohkawa for an invention entitled "Plasma Mass Filter" (hereinafter the "Ohkawa Patent"), and which is assigned to the same assignee as the present invention, can be used for the same purposes. With either type device, centrifuge or filter, the difference between the masses of the particles that are to be separated is a significant factor for consideration. This consideration is important in both the design and operation of the device, and becomes more significant as the difference in mass between particles becomes less.

By definition, the mass number of an atom, "M", is the total number of protons and neutrons in its nucleus. Also, by definition, an isotope is one of a set of chemically identical species of an atom which have the same atomic number (i.e. same number of protons), but which have different mass numbers (i.e. a different number of neutrons). Further, it can happen that a material will include different isotopes. When this happens, it may be desirable for a variety of reasons to manipulate the material by separating its minority isotope ions from its majority isotope ions.

Mathematically, it can be shown that the separation of minority isotope ions from majority isotope ions in a plasma can be quantified by a separation factor "$\epsilon$" which is expressed as:

$$\epsilon = \exp\{\Delta M \omega^2 r^2 / 2 k_B T\}$$

where, $\Delta M$ is the mass difference between the minority and majority isotopes, "$\omega$" is the angular rotational frequency of the plasma, "r" is the radial distance of a particle from the axis of rotation, $k_B$ is Boltzmann's constant, and "T" is the ion temperature in the plasma.

From the above expression for the separation factor "$\epsilon$", several particulars affecting the separation of charged particles in a rotating plasma can be appreciated. First, it is to be noted that the separation factor "$\epsilon$" is directly proportional to $\Delta M$. Accordingly, for the separation of isotopes, where $\Delta M$ is typically small, separation will be inherently more difficult than when different elements are involved. Despite this observation, however, it would initially appear that greater separation efficiency can be achieved merely by increasing the rotational energy of the plasma (rotational energy is proportional to "$\omega^2$"). It turns out the situation is not quite so simple.

Increasing the rotational energy to increase the separation efficiency of a gaseous or plasma centrifuge has its limitations. It happens that as the mass of particles to be separated is increased, more rotational energy is required. Particularly for high mass isotopes, where $\Delta M/M \ll 1$, significant rotational energy may be required to achieve effective separation. The maximum permissible rotational energy in a conventional gas centrifuge, however, is restricted by the strength of the rotor, and as a consequence, many passes through a centrifuge have been required to effectively separate minority isotope ions from majority isotope ions.

In addition to the above observations, it is also known that in plasma centrifuges, as the rotational energy of a plasma is increased, so too is its thermal energy. Consequently, according to the expression for the separation factor "$\epsilon$" given above, when both rotational and thermal energy are increased together there may be little, if any, net gain in efficiency. In addition, the standard plasma centrifuge has two solutions: a high rotation frequency that is difficult to access, and the normal low rotation frequency solution. It can be shown that even with high rotation solution in the standard plasma centrifuge, the electrons are not rotating at the same velocity and the resultant azimuthal drag on the ions result in a radial drift that interferes with the mass separation. On the other hand, the above expression also indicates that an increase in efficiency can be achieved by lowering the temperature "T" of ions in the plasma.

In light of the above, it is an object of the present invention to provide an isotope separator that is effective for separating relatively high mass isotopes from lower mass isotopes when the difference between the mass numbers of the isotopes is relatively minimal ($\Delta M/M \ll 1$). Another object of the present invention is to provide an isotope separator that can effectively separate minority isotope ions from majority isotope ions in a single pass of the ions through the separator. Still another object of the present invention is to identify dimensional requirements, along with operational parameters, that will increase the efficiency of an isotope separator. Yet another object of the present invention is to provide an isotope separator that is relatively easy to manufacture, is simple to operate, and comparatively cost effective.

SUMMARY OF THE PREFERRED EMBODIMENTS

In accordance with the present invention, a device for separating isotope ions includes a cylindrical chamber which defines a longitudinal axis. Dimensionally, the chamber has a length "L" that extends along the axis between the ends of the chamber, and it has a radius "a" that is measured from the axis. An injector for introducing a plasma into the chamber is mounted at an end of the chamber so that the plasma will travel the length "L" as the plasma transits through the chamber. For the present invention it is envisioned that the plasma will include both minority isotope ions having a mass number "$M_1$" and majority isotope ions having a mass number "$M_2$". Further, it is envisioned that these mass numbers can be relatively high, with $M_1=M_2+\Delta M$, and $M_1 \cong M_2 \cong M$ such that $\Delta M/M \ll 1$. For the present invention, because $M_1 \cong M_2$, the mass number "M" of the majority isotope alone can be used for purposes of calculating operational parameters for the chamber.

For the operation of the present invention, crossed electric and magnetic fields (E×B) are established inside the chamber. Specifically, the crossed electric and magnetic fields are established with specific values to excite the plasma with a rotational energy. Preferably, the temperature of the isotope ions ($T_i$) inside the chamber, due to this rotational energy, will be in a range between approximately one hundred and four hundred electron volts ($T_i=100 \sim 400$ eV). In contrast, the temperature of electrons in the plasma ($T_e$), will be maintained in a range of approximately one to five electron volts ($T_e=1\sim 5$ eV).

For the specific case wherein a plasma centrifuge is being used to separate isotope ions, the crossed electric and magnetic fields are established so as to confine all of the isotopes on trajectories inside the plasma chamber as they transit the chamber. Thus, in accordance with the Ohkawa Patent, a so-called cut-off mass "$M_c$" is established to be greater than "M" (the mass of the isotopes) for singly ionized ions. Preferably, for purposes of the present invention, "$M_c$" will be selected to be approximately twice as high as "M". Calculations can therefore be made using a value for the ratio $M/M_c$ without necessarily calculating "$M_c$" (e.g. $M/M_c=0.5$).

An important aspect of the present invention is that the electrons in the plasma are used to cool the isotope ions (recall; $T_e \cong T_i/100$). Specifically, this is done in order to effectively improve the separation factor "$\epsilon$" set forth above.

As envisioned for the present invention, the cooling process and consequent improvement in the separation factor "$\epsilon$" is accomplished by increasing the residence time, $\tau_1$, during which the plasma is held in the chamber. For the present invention, this is done by properly engineering the length "L" of the chamber. In particular, the length "L" is selected so that the residence time, $\tau_1$, is longer than the required cooling time, $\tau_2$.

In addition to merely lengthening the chamber in order to accomplish the purposes mentioned above, the present invention also envisions alternate embodiments for the chamber. For one alternate embodiment, the magnetic field "B" is manipulated. Specifically, the magnetic field is configured to have a strength "$B_e$" at both ends of the chamber, and a strength "$B_m$" therebetween. In this embodiment, $B_e > B_m$ to increase the residence time, $\tau_1$.

BRIEF DESCRIPTION OF THE DRAWINGS

The novel features of this invention, as well as the invention itself, both as to its structure and its operation, will be best understood from the accompanying drawing, taken in conjunction with the accompanying description, in which similar reference characters refer to similar parts, and in which:

The FIGURE is a perspective view of a plasma centrifuge as used for the purposes of the present invention, with portions broken away for clarity.

DESCRIPTION OF THE PREFERRED EMBODIMENT

Referring to the FIGURE, a plasma centrifuge for use with the present invention is shown and is generally designated 10. As shown, the centrifuge 10 includes a cylindrical shaped wall 12, which defines a longitudinal axis 14. The wall 12 also surrounds a chamber 16 which has a length "L" that extends from the end 18 of the chamber 16 to the end 20. The chamber 16 also has a radius "a" that extends from the axis 14 to the wall 12.

A plurality of magnetic coils 22 are mounted on the outside of the wall 12, and are oriented around the chamber 16 to generate a magnetic field "B" inside the chamber 16. For purposes of the present invention, this magnetic field "B" is preferably uniform, and it is generally aligned with the axis 14. The centrifuge 10 also includes an electrode (not shown) which generates a radially oriented electric field "E" inside the chamber 16. For the centrifuge 10 of the present invention, the electrode may be either a series of ring electrodes, or a spiral electrode of a type well known in the pertinent art. In either case, the electrode is intended to generate an electric field "E" that is directed outwardly from the axis 14 and is generally oriented perpendicular to the magnetic field "B". Consequently, crossed electric and magnetic fields (E×B) are established inside the chamber 16.

As intended for the present invention, a plasma 24 is introduced into the chamber 16 where it is subjected to the effects of the crossed electric and magnetic fields (E×B). Further, as also intended for the present invention, the plasma 24 will include electrons 26, majority isotope ions 28 and minority isotope ions 30. It may happen that the majority isotope ions 28 will also be of the heavier isotope and the minority isotope ions 30 will have less mass, or vice versa. In either case, the plasma 24 can be introduced into the chamber 16 by any means well known in the art, such as through the plasma injector 32. Further, it is to be appreciated that the plasma 24 can either be introduced into the chamber 16 at an end 18, or it can be introduced (established) somewhere inside the chamber 16. Regardless where it may be introduced into the chamber 16, it is an important aspect of the present invention that the plasma 24 is required to transit through a length "L" before exiting the chamber 16. In general, it is envisioned that after transiting the length "L" through the chamber 16, the plasma 24 will become a separated plasma 24, and will exit through an open end 20.

It is also appreciated that an alternate embodiment of the present invention can be provided by reconfiguring the magnetic field "B". Specifically, for this alternate embodiment, the magnetic field is configured to have a strength $B_e$ at both ends 18, 20 of the chamber 16, with a strength $B_m$ therebetween. In this embodiment, $B_e > B_m$ and this arrangement effectively increases the plasma length, "L."

The design and manufacture of a plasma centrifuge 10 essentially requires determining functional magnitudes for "E" and "B" of the electric and magnetic fields, as well as the length "L" of the chamber 16. By way of example, consider a case wherein the separation factor has been selected (e.g. $\epsilon=7$) and the value of $\Delta M/M$ has been determined (e.g. 3/238). In this example, "M" has been taken as the mass number of the majority isotopes 28, and $\Delta M$ is the mass difference between the minority isotopes 30 and majority isotopes 28. Next, using the expression:

$$\epsilon = \exp\{[\Delta M/M]\mu^2\}$$

a value $\mu^2=154$ ($\mu$ is Mach number) is obtained. Next, a reasonable electron temperature ($T_e$) is estimated (e.g. $T_e=1.5$ eV). The expression for $\mu^2$ that is derived from energy considerations, namely:

$$\mu_2 = M\omega_2 r_2 / 2 k_B T_e$$

can now be used to determine the angular rotational frequency of the plasma 24. In this case "r" is taken to be the radius "a" of the chamber (e.g. r=a=0.4 m), and $k_B$ is Boltzmann's constant. The calculated angular rotation frequency is then determined to be $\omega=3.4\times10^4$/s. By setting a value for $M/M_c$ (e.g. $M/M_c=0.5$), the cyclotron frequency of the plasma "$\Omega$" can be calculated from the expression:

$$\omega = -\Omega/2\{1\pm[1-M/M_c]^{1/2}\}$$

For the parameter values being used in this example, the cyclotron frequency is determined to be $\Omega=2.3\times10^5$/s. The magnitude of the magnetic field "B" for singly charged ions can then be found from the expression:

$$\Omega = eB/M.$$

Here, B=0.56T. From the following expression:

$$M/M_c = 4\alpha/\Omega,$$

"$\alpha$", can be directly determined and used to obtain $V_{ctr}$ (i.e. the magnitude of the electric field along the axis 14 of the chamber 16) from the expression:

$$\alpha = 2V_{ctr}/r^2 B.$$

Along with the operational parameters determined by the above mentioned calculations, the length "L" of the chamber 16 can be determined relative to a residence time, $\tau_1$, during which the plasma 24 must remain in the chamber 16 under the influence of the crossed electric and magnetic fields (E×B). Importantly, the residence time, $\tau_1$, needs to be greater than the required cooling time, $\tau_2$, with:

$$\tau_1 \delta L/v_s; \text{ and}$$

$$\tau_2 \delta M\sigma/e^2 n$$

wherein, "$v_s$" is the sound velocity, "$\sigma$" is the Spitzer conductivity and "n" is the plasma density. Using a plasma density $n=2.7\times10^{19} m^{-3}$ it can be shown for this example that $\tau_2=2.9\times10^{-3}$s and, consequently, the length "L" must be longer than 12 m.

In the operation of the centrifuge 10, a plasma 24 is introduced (or established) inside the chamber 16. As shown in the FIGURE, the plasma 24 can be introduced into the chamber 16 by an injector 32 at the end 18 of the chamber 16. This plasma 24 will include both majority isotope ions 28 and minority isotope ions 30. For purposes of discussion, consider here that the minority isotope ions 30 have a lower mass number (M) than do the majority isotope ions 28. Consequently, as the majority isotope ions 28 and minority isotope ions 30 move through the length "L" of chamber 16, on their respective trajectories 34 and 36, the majority isotope ions 28 (due to their relatively higher mass number) will drift further in a radial direction toward the wall 12 of the chamber 16 than will the minority isotope ions 30. This tendency, which results from the mathematical discussion presented herein, will separate the ions 28 and 30 from each other, with the minority isotope ions 30 being closer to the axis 14.

As shown in the FIGURE, a baffle 38 and a light isotope collector 40 are provided at the end 20 of the chamber 16. Specifically, the light isotope collector 40 is a substantially cylindrical shaped structure which is centered on the axis 14 and which has a radius "$a_1$". Thus, the baffle 38 has a width that is equal to the difference between the radius of the chamber 16 and the radius of the light isotope collector 40 (i.e. $a-a_1$). With this structure, the majority isotope ions 28 can be collected on the baffle 38, while the minority isotope ions 30 are separately collected in the light isotope collector 40.

While the particular Isotope Separator as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A separator which comprises:

a cylindrical chamber defining a longitudinal axis, and having a radius "a" and a length "L";

a means for introducing a plasma into said chamber, wherein the plasma includes a plurality of isotope ions having a mass number "$M_1$" and a plurality of isotope ions having a mass number "$M_2$" wherein "$M_1$" is greater than "$M_2$"; and a means for maintaining an electron temperature in a range of approximately one to five electron volts (1–5 eV) to cool the isotopes $M_1$ and $M_2$ for separation thereof during an axial transit of the plasma through said length "L".

2. A separator as recited in claim 1 wherein said exciting means comprises:

a means for establishing crossed electric and magnetic fields (E×B) in said chamber with the magnetic field oriented substantially parallel to said axis of said chamber; and a means for configuring the magnetic fields (E×B) to establish a cut-off mass "$M_c$", wherein $M_c$ is greater than M and, for singly ionized ions, is determined by:

$$M_c = Zea^2 B^2 / 8 \, V_{ctr}$$

wherein "e" is the elementary charge, B is the magnetic flux density of the magnetic field along said axis, and $V_{ctr}$ is the potential of the electric field, E.

3. A separator as recited in claim 2 wherein the plasma transits the length "L" of said chamber during a residence time, $\tau_1$, and wherein the residence time, $\tau_1$, is greater than a cooling time, $\tau_2$.

4. A separator as recited in claim 3 wherein said chamber has a first end and a second end and wherein the magnetic field "B" has a strength "$B_e$" at said first end and at said second end, and a strength "$B_m$" therebetween, and wherein $B_e > B_m$ to increase the residence time, $\tau_1$.

5. A separator as recited in claim 3 further comprising a light isotope collector concentrically mounted on the longitudinal axis for collecting the isotope ions of mass number "$M_2$".

6. A method for using a separator which comprises the steps of:

provifing a cylindric chamber defining a longitudinal axis, the chamber having a radius "a" and a length "L";

introducing a plasma into said chamber, wherein the plasma includes a plurality of isotope ions having a mass number "$M_1$" and a plurality of isotope ions having a mass number "$M_2$", wherein $M_1 = M_2 \Delta M$, with $M_1 \cong M_2 \cong M$ and wherein $\Delta M/M \ll 1$; and maintaining an electron temperature in a range of approximately one to five electron volts (1–5 eV) to cool the isotopes "$M_1$" and "$M_2$" for separation thereof during an axial transit of the plasma through said length "L".

7. A method as recited in claim 6 wherein said exciting step comprises the steps of:

establishing crossed electric and magnetic fields (E×B) in said chamber with the magnetic field oriented substantially parallel to said axis of said chamber; and configuring the magnetic fields (E×B) to establish a cut-off mass "$M_c$", wherein "$M_c$" is greater than "M" and is determined by:

$$M_c = Zea^2B^2/8\ V_{ctr}$$

wherein "e" is the elementary charge, "B" is the magnetic flux density of the magnetic field along said axis, and $V_{ctr}$ is the potential of the electric field, E.

8. A method as recited in claim 7 wherein the plasma transits the length "L" of said chamber during a residence time, $\tau_1$, and wherein the residence time, $\tau_1$, is greater than a cooling time, $\tau_2$.

9. A method for manufacturing a cylindrical shaped plasma chamber having a radius "a", and length "L", with crossed electric and magnetic fields (E×B) being generated in the chamber for use in separating minority and majority isotopes from each other in a plasma, the method comprising the steps of:

establishing the rotational energy of the plasma necessary to achieve a preselected separation factor "ϵ" inside the chamber;

evaluating the cooling effects of electrons on the plasma for a preselected electron temperature ($T_e$);

determining respective magnitudes for the crossed electric and magnetic fields (E×B) required for confinement of the plasma inside the chamber as the plasma transits axially through the chamber along the length "L";

calculating a required cooling time; and finding the length "L" necessary to provide the required cooling time.

10. A method as recited in claim 9 wherein the length "L" of the chamber is determined relative to a residence time, $\tau_1$, and wherein the residence time, $\tau_1$, is greater than the required cooling time, $\tau_2$, determined by said calculating step.

11. A method as recited in claim 10 wherein the chamber has a first end and a second end and wherein the magnetic field "B" has a strength "$B_e$" at the first end and at the second end, and a strength "$B_m$" therebetween, and wherein $B_e > B_m$ to increase the residence time, $\tau_1$.

12. A method as recited in claim 10 wherein the plasma includes isotope ions having a relatively high mass number "$M_1$" and isotope ions having a relatively low mass number "$M_2$", the method further comprising the step of providing a collector to collect the isotope ions "$M_2$".

13. A method as recited in claim 10 wherein the electron temperature is maintained in a range of approximately one to five electron volts (1–5 eV).

14. A method as recited in claim 10 wherein the length "L" of the chamber is determined to be greater than twelve meters (L>12 m).

* * * * *

UNITED STATES PATENT AND TRADEMARK OFFICE
CERTIFICATE OF CORRECTION

PATENT NO. : 6,726,844 B2
DATED : April 27, 2004
INVENTOR(S) : Tihiro Ohkawa and Robert L. Miller It is certified that error appears in the above-identified patent and that said Letters Patent is hereby corrected as shown below:

Column 5,
Line 11, delete "$\mu_2$" insert -- $\mu^2$ --
Line 45, delete "$\delta$" insert -- $\approx$ -- (both occurrences)

Column 7,
Line 8, delete "$M_2 \Delta M$," insert -- $M_2 + \Delta M$, --

Signed and Sealed this

Second Day of November, 2004

JON W. DUDAS
*Director of the United States Patent and Trademark Office*